A. HAMAR.
Manufacture of Nitro-Glycerine.
No. 137,440. Patented April 1, 1873.
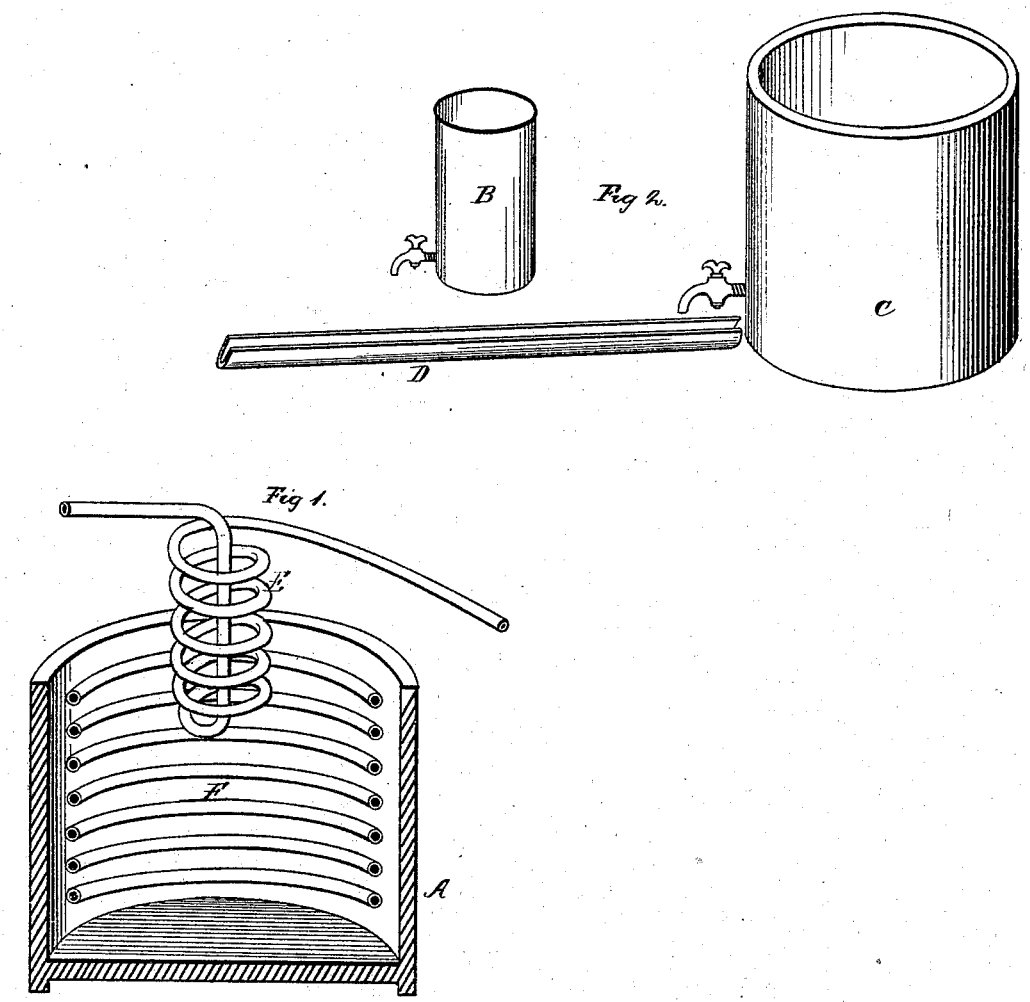
Witnesses.
H. L. Perrine
A. H. Norris.
Inventor.
Alexander Hamar,
Per. James L. Norris.
Attorney.

UNITED STATES PATENT OFFICE.

ALEXANDER HAMAR, OF PHILADELPHIA, PENNSYLVANIA.

IMPROVEMENT IN THE MANUFACTURE OF NITRO-GLYCERINE.

Specification forming part of Letters Patent No. 137,440, dated April 1, 1873; application filed March 22, 1873.

*To all whom it may concern:*

Be it known that I, ALEXANDER HAMAR, of Philadelphia, in the county of Philadelphia and State of Pennsylvania, have invented certain new and useful Improvements in the Manufacture of Nitro-Glycerine, of which the following is a specification:

This invention relates to a novel apparatus and process for manufacturing nitro-glycerine, dispensing with the usual mechanical devices for mixing or commingling the nitric acid or acid mixture with the glycerine, and producing a superior quality of nitro-glycerine, not liable to decomposition, which is invariably the cause of accidental explosions. The first feature of the invention consists in the relative arrangement in respect to a channel or conduit trough of separate tanks or receiving-vessels for the acid mixture and glycerine, which, when liberated, are mixed or commingled in said conduit and distributed in a shower or cascade over a cooling-coil situated within a receiving-tank, which also contains a worm for perfectly cooling the mixture. The second feature of the invention consists in agitating the mixture of acid and glycerine in a solution of chloride of sodium in a suitable receiving-tank, thus producing a superior quality of nitro-glycerine, not liable to decomposition.

In the drawing, Figure 1 is a vertical section of the receiving-tank. Fig. 2 is a perspective view of mixing apparatus.

A represents the vessel or tank for receiving the acid and glycerine mixture, in suitable proximity to which are arranged elevated receivers or vessels B C, containing, respectively, the glycerine and mixture of nitric and sulphuric acids. In proper relation to said receivers A B C is arranged a trough or conduit, D, into which the contents of the receivers B C are discharged to be delivered to the delivery or lower end of the trough, where the mixture is distributed in a cascade or shower over the serpentine coil of pipe E, through which passes a constant current of water for cooling the mixture, which is ultimately collected in the receiving-tank A. Said tank contains, also, a worm or series of pipes, F, for perfectly cooling the mixture of acid and glycerine, which, after having been intimately mixed or commingled by its fall over the cooling-coil, and collected in the receiving-tank, is from thence conducted into a separate receiver or vessel, in which chloride of sodium is held in solution in water in about the proportions of seven pounds of the former to five or six gallons of the latter.

The nitro-glycerine is well agitated in this solution by any suitable devices for a proper period of time, and is then washed in clear water, when the last stage of the manufacturing process is completed.

Nitro-glycerine, when manufactured as above described, is somewhat thicker than the ordinary kind, but is less liable to explode accidentally, as it does not decompose or evolve gases.

The commingling of the acid mixture and glycerine, performed solely by the discharge of the same in a conduit common to both, and the cascading over a cooling coil of pipe, obviates the employment of the expensive mechanical agitating devices hitherto in use, and such a process also saves a considerable quantity of acid; for if in the event the same is not thoroughly mixed with the glycerine in the first run, it can be taken from the receiving-tank back into the acid-tank for a second mixture.

Having fully described my invention, what I claim as new is—

1. The apparatus herein described for the manufacture of nitro-glycerine, consisting of a receiving-tank with a cooling-coil, upon which the mixture of acid and glycerine is caused to fall for mixing and cooling the same, as set forth.

2. The mode herein described of automatically manufacturing nitro-glycerine by flowing the acid and glycerine through a trough upon a cooling-coil, substantially as described.

3. The use of chloride of sodium, or its equivalent, in the manufacture of nitro-glycerine.

In testimony that I claim the foregoing I have hereunto set my hand.

A. HAMAR.

Witnesses:
JAMES L. NORRIS,
WM. J. PEYTON.